United States Patent [19]
Shulick et al.

[11] 3,805,742
[45] Apr. 23, 1974

[54] MILKING STALL WITH FORCER GATE

[75] Inventors: Robert J. Shulick, St. Charles; Lyle L. Needham, Bellwood; Harold V. Swanson, Downers Grove, all of Ill.

[73] Assignee: Babson Bros., Co., Oak Brook, Ill.

[22] Filed: Aug. 14, 1972

[21] Appl. No.: 280,731

[52] U.S. Cl. ............................. 119/27, 119/14.03
[51] Int. Cl. ................................................ A01j 1/00
[58] Field of Search ......... 119/27, 14.03, 14.04, 63, 119/96

[56] References Cited
UNITED STATES PATENTS
3,703,884  11/1972  Maddalena ........................... 119/27
2,692,577  10/1954  Thomas ................................ 119/27

Primary Examiner—Robert Peshock
Assistant Examiner—J. N. Eskovitz
Attorney, Agent, or Firm—Hofgren, Wegner, Allen, Stellman & McCord

[57] ABSTRACT

A restraining stall for cows during milking or preparation prior to milking. The stall includes a front gate and a rear gate along with a feed manger adjacent the front gate from which the cow may feed during milking or preparation prior to milking. In order to positively deter the cow from continuing to feed after the milking or the preparation process, the stall is provided with a forcer gate adapted to swing across the front of the manger and toward the front gate. Means are provided responsive to the opening of the front gate for operating the forcer gate. Also provided is a control system for sequentially operating the gate.

9 Claims, 4 Drawing Figures

MILKING STALL WITH FORCER GATE

BACKGROUND OF THE INVENTION

This invention relates to cow restraining stalls, and, more particularly, to stalls employed in restraining cows during milking or preparation prior to milking.

The art of dairying, like so many other areas of agriculture, has had increasing attention focused thereon to improve the efficiency of various facets thereof. Increasingly, it has been difficult for a farmer having a relatively small dairy herd to subsist on the income produced thereby.

Thus, the trend has been towards larger and larger herds which, or course, poses new problems simply due to the sheer numbers of dairy cows involved.

As a result, new proposals for automating facets of dairying are constantly arising. Most are directed to minimizing the amount of manual effort required in the milking process beginning with the preparation of a cow for milking and terminating with the completion of the actual milking of the cow. One such proposal is disclosed in U.S. Pat. No. 3,246,631 to Holm. In the Holm system, a plurality of stalls are used including a pre-preparation stall whereat the cow's udder is washed prior to the milking thereof, a preparation stall whereat the cow's udder is rinsed and stimulated to cause milk let-down, and finally, a milking stall whereat the claw of a milking machine is applied to the teats of the cow and the cow is milked.

Holm also makes provision for the feeding of the cows during the pre-preparation, preparation and milking processes while they are in each of the stalls.

In the commonly assigned, copending application of Needham et al, entitled, "Cow Preparation Stall for Milking Parlors," filed June 13, 1972 which is continuation-in-part of Needham et al. application Ser. No. 75,951, filed Sept. 28, 1970, entitled "Milking Parlor with Cow Preparation Stall," and now abandoned, there is disclosed an improved preparation stall wherein both washing and rinsing operations occur in but a single stall eliminating the necessity of two stalls as in Holm. Needham et al also make provision for the feeding of a cow during the preparation cycle.

One difficulty attends the use of such stalls wherein cows are fed during preparation and milking. In particular, the problem arises when the milking or preparation cycle has been completed and the front gate of the stall is opened to allow the cow to leave so that another may take its place. In some instances, balky cows will continue to feed at the feed manger and refuse to exit through the now open front gate.

One solution to this problem is found in both the Holm and Needham et al disclosures and includes the locating of a feed bowl on a front gate of the stall and mounted for movement therewith coupled with a direction of gate movement towards an opened position wherein the feed bowl is swung exteriorly of the stall and away from the mouth of a cow. While such systems are perfectly acceptable for their intended purpose insofar as precluding a cow from continuing to feed and thereby eliminating that problem as deterring the cow's exit from the stall, they do not provide a positive impetus to the cow to leave the stall through the opened front gate. Moreover, since the movement of the feed manger is with the gate, and such movement will normally be controlled automatically, there is no necessary interrelation between the ability of a cow to have access to the feed manger and presence of a cow in the stall as sometimes is desirable.

SUMMARY OF THE INVENTION

It is the principal object of the invention to provide a new and improved stall for retaining cows during milking or preparation prior to milking. More particularly, it is an object of the invention to provide such a stall wherein means are provided for precluding a cow from feeding in a feed manger associated therewith while providing a positive impetus to the cow in the direction of an open front gate of the stall and wherein the means include the additional advantage of being usable to sense the presence of a cow in the stall.

The exemplary embodiment of the invention achieves the foregoing object by means of a construction including a stall having a feed manger defining the front end thereof and front and rear gates which are selectively openable to admit and release the cow therefrom. Pivotally mounted on one of the sides of the stall and adjacent the front end thereof is a swingable forcer gate which can be moved between a position normally approximately coextensive with the side of the stall and a position whereat one end blocks access to the feed manger. Means are provided for swinging the forcer gate to the second mentioned position upon the opening of the front gate.

According to a preferred embodiment, the stall has one fixed side and the rear gate and a portion of the opposite side is defined by an L-shaped gate member. The remaining portion of the opposite side is defined by the front gate so that as the front gate opens, and the forcer gate is swung, a positive impetus is given to the cow away from the feed manger and toward the now open front gate.

The preferred embodiment also contemplates the use of a linkage between the front gate and the forcer gate through which the latter responds to the opening of the former. Preferably, the same includes a lost motion connection which may serve either one or both of two purposes.

For one, the lost motion connection allows the front gate to partially open before the forcer gate is moved. Secondly, the lost motion connection will allow the front gate to completely close while allowing the forcer gate to remain in the position blocking the feed manger but also free to move towards its position generally aligned with the side of the stall. Thus, when a cow enters the stall under such circumstances, it will normally push at the forcer gate to achieve access to the feed manger and since the forcer gate will be free to move in such instances, the resulting movement back toward its position aligned with the side of the stall can be taken as an indication of the entry of a cow into the stall eliminating the need of other equipment for the purpose.

The invention also contemplates the use of power operators associated with both the L-shaped rear gate and the front gate and a novel control system whereby the gates can be controlled and may be employed in conjunction with other equipment. For example, as illustrative of the latter aspect, if the stall is used as a milking stall, the control circuit may be made to operate a preparation stall for a cow and operative to automatically release a cow from such a preparation stall upon the movement of a cow out of the milking stall.

Other objects and advantages of the invention will become apparent from the following specification taken in conjunction with the accompanying drawings.

DESCRIPTION OF THE PREFERRED EMBODIMENT

Figure 1:
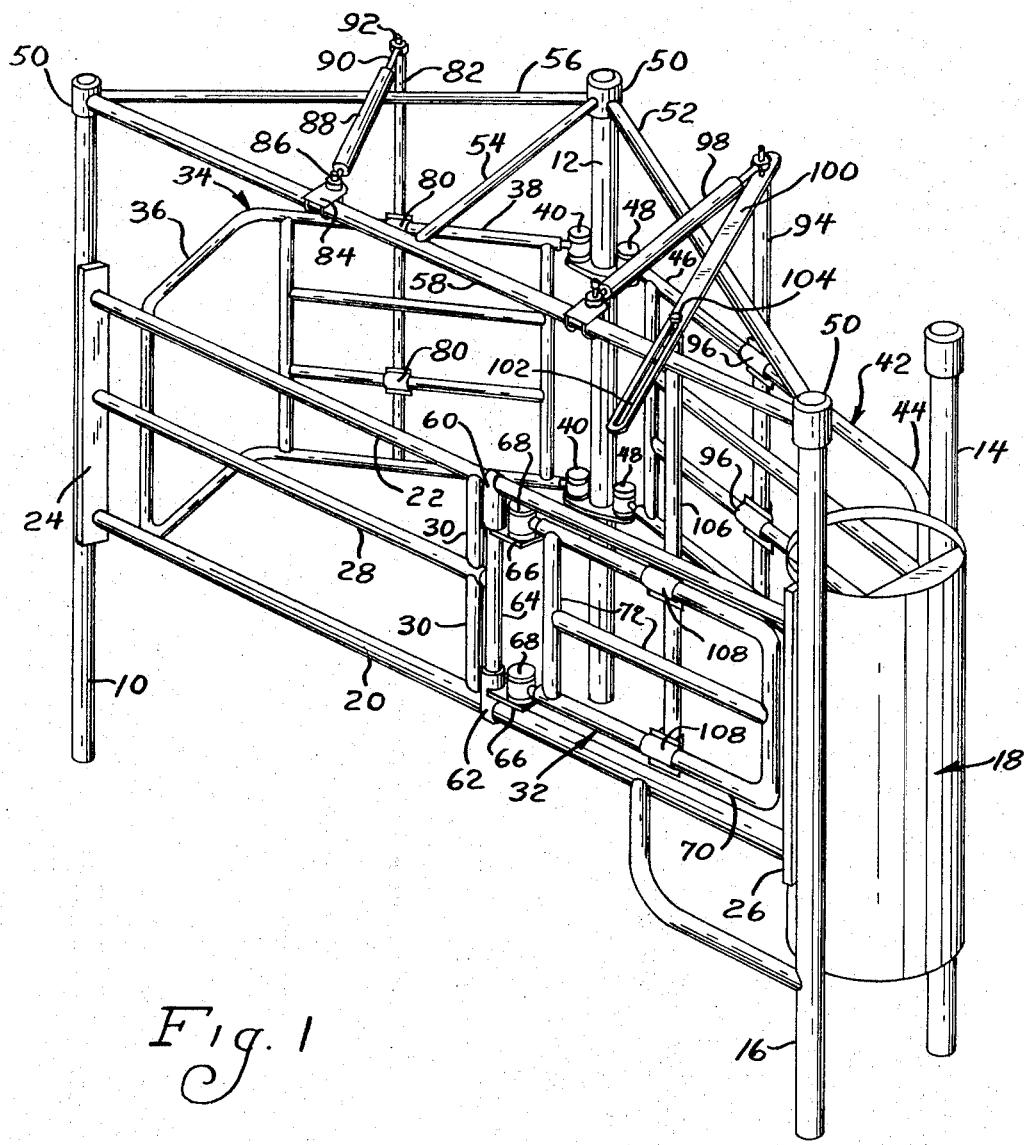
FIG. 1 is a perspective view of a stall made according to the invention.

An exemplary embodiment of a stall made according to the invention, and particularly a stall suited for retention of a cow during milking, as opposed to during preparation prior to milking, is illustrated in FIG. 1 and is seen to include four principal uprights 10, 12, 14 and 16. The uprights 10–16, inclusive, are supported in a vertical orientation by any suitable means, as, for example, being cast in concrete which, in turn, defines the floor of the stall.

Between the uprights 14 and 16 is a feed manger, generally designated 18, which may be of conventional construction and may be provided with an automatic means for metering a predetermined amount of feed thereinto from equipment not shown. Since there are a variety of such systems available, they need not be described here. It is merely sufficient to note that the feed manger 18 defines the front of the stall.

One side of the stall is defined by upper and lower pipe-like cross members 20 and 22 which extend between vertically oriented plates 24 and 26 secured as by bolts or welding to the uprights 10 and 16. The side is further defined by a partial cross member 28 which extends between the plate 24 and a vertically oriented member defined by pipe sections 30. The remainder of the side is defined by a forcer gate, generally designated 32, to be described in greater detail hereinafter.

The rear of the stall and a portion of the other side thereof is defined by an L-shaped, rear gate, generally designated 34. The rear gate 34 may be formed generally in the configuration shown and includes a base section 36 defining the rear of the stall and a leg 38 defining a portion of the side of the stall. The end of the leg 38 opposite the base 36 is pivotally secured to the upright 12 by any suitable trunnions 40 for rotation about a vertical axis. As a result, it will be appreciated that the stall may be opened by swinging the rear gate 34 in a generally clockwise direction as viewed in FIG. 1 to move the base 36 away from a position adjacent the upright 10 at which the stall is closed to a position remote therefrom whereat the stall is open.

The remainder of the opposite side of the stall is defined by a generally planar front gate, generally designated 42, having a free end 44 adjacent the upright 14 and having its opposite end 46 pivotally connected by trunnions 48 to the upright 12 to mount the gate 42 for pivotal movement about a vertical axis. Thus, when the free end 44 is pivoted in a counterclockwise direction on the trunnions 48, as viewed in FIG. 1, the front gate 42 may be moved away from the closed position to an open position remote from the upright 14.

To add rigidity to the stall, the upper ends of the uprights 10, 12 and 16 each include collars 50 between which a triangular configuration of pipe-like supports 52, 54, 56 and 58 extend. The supports 52–58, inclusive, are sufficiently elevated so that a cow may freely enter the stall therebelow and serve the additional purpose of mounting power actuating equipment for the front and rear gates 34 and 42 respectively as will be seen.

Returning now to the forcer gate 32, the cross member 22, adjacent the pipe 30, mounts a depending fitting 60 while the cross member 20 mounts an upwardly extending fitting 62 aligned with the fitting 60. A pipe 64 interconnects the two fittings 60 and 62 and each fitting further mounts a horizontally extending plate 66 which is directed towards the feed manger 18. The plates 66 each, in turn, mount trunnions 68 which pivotally mount the forcer gate for movement about a vertical axis.

The forcer gate includes a generally U-shaped member 70 rigidified by a T-shaped network of pipes 72. The legs of the U-shaped member 70 are secured to the trunnions 68 by any suitable means and the length thereof is such that the base of the U-shaped member 70 will extend almost to the plate 26. Thus, it will be appreciated that the forcer gate 32 can be maintained in a position virtually within the confines of the side wall defined by cross members 20 and 22, or in other words, may be substantially aligned therewith. It will also be appreciated by reason of the pivotal mounting of the forcer gate 32 on the trunnions 68, the free end thereof defined by the base of the U-shaped member 70 can be pivoted inwardly into the stall and across the front of the feed manger 18 to block access to the same.

As generally alluded to previously, automatic, powered operation of the various gates is contemplated by the invention. To this end, portions of the rear gate 34 mount brackets 80 which, in turn, secure thereto a vertically extending operating member 82. The arrangement is such that the operating member 82 is on the stall exterior of the pipe 56 and the length of the operating member 82 is such that the upper end of the same projects somewhat above the pipe 56.

The pipe 58 has a bracket 84 secured thereto which, in turn, by means of a pivotal connection 86, mounts one end of a fluid operated cylinder 88, preferably of the pneumatic variety. The opposite end of the cylinder 88 and, specifically, the piston rod 90 thereof is pivotally connected by means of a pivotal connection 92 to the upper end of the operating member 82. The arrangement is such that when the piston rod 90 is withdrawn in the cylinder 88, the rear gate 34 will be closed while, when the piston rod 90 is extended, the rear gate will be swung to an open position.

The front gate 42 is also provided with an operating member 94 secured thereto by means of brackets 96. Again, the location of the operating member 94 is such that the same is on the stall exterior side of the pipe 52 and extends thereabove. An operating cylinder 98, again preferably pneumatic, interconnects the pipe 58 and the operating member 94 in a manner generally identical to the connection between the corresponding elements for the rear gate 34. In addition, an elongated link 100 is pivotally secured to the upper end of the operating member 94. The link 100 at its end opposite its point of connection to the operating member 94 includes an elongated slot 102 in which a pin 104 is received.

The pin 104 is on the upper end of an operating member 106 for the forcer gate 32. The operating member 106 is secured to the forcer gate by means of brackets 108 and is located thereon such that it is within the confines of the stall and its upper end extends above pipe 58 for connection to the link 100. As a result of the foregoing, it will be appreciated that the pin 104 and the slot 102 define a lost motion connection between the front gate 42 and the forcer gate 32.

Figure 2:
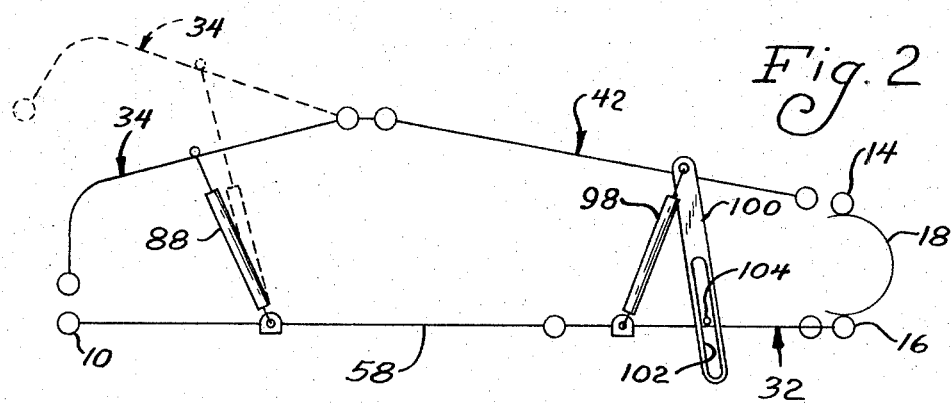
FIG. 2 is a schematic plan view of the stall illustrating one configuration of the gates.

With reference now to FIG. 2, the extreme positions of the rear gate 34, that is the open and shut positions, are shown in dotted lines and solid lines respectively. As mentioned, operation of the reargate cylinder 88 is operative to move the gate 34 between the two positions.

FIG. 2 also illustrates the front gate in a closed position and the forcer gate 32 in a position whereat access to the manger 18 may be achieved. It will be noted that in this position, the pin 104 is midway along the length of the slot 102 and the link 100.

Figure 3:
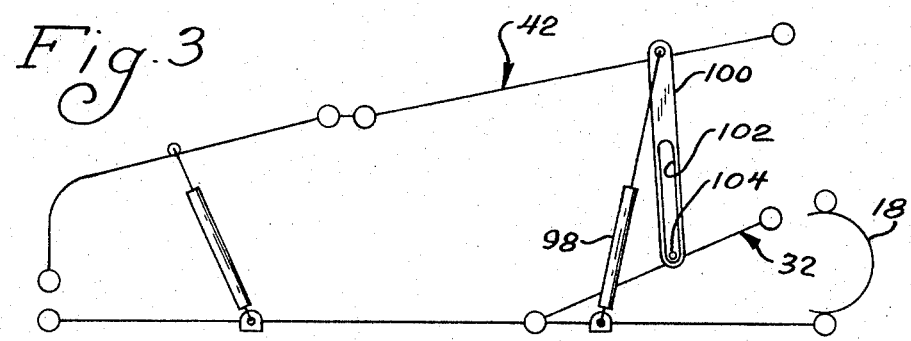
FIG. 3 is a schematic plan view of the stall illustrating another configuration of the gate.

Referring now to FIG. 3, it will be seen that the piston rod of the front gate opening cylinder 98 has been extended with the result that the front gate 42 has been moved to an open position and the link 100 moved so that the pin 104 is in the end of the slot 102 remote from the front gate 42. It will be appreciated that once the link 100 has moved sufficiently so that the pin 104 is in such a position, the forcer gate 32 is moved to a position blocking access to the manger 18 and will be held in such a position so long as the cylinder 98 has its piston rod extended.

This arrangement allows the front gate 42 to partially open before the forcer gate 32 is moved to block access to the manger 18. As a result, once the forcer gate 32 engages a cow, there will already be in existence an opening for exit from the stall to which the cow will be directed by continued movement of the forcer gate 32 until a full blocking position has been reached. This arrangement positively acts to direct the cow toward the opening without frightening the cow as might possibly be the case if the forcer gate 32 were to move to a blocking position before any appreciable opening of the front gate 42 occurred.

It will also be appreciated from an examination of FIGS. 2 and 3 that when the front gate 42 is returned to a closed position, the length of the slot 102 is such that the forcer gate 32 will not be swung back to a position aligned with the side of the stall. Rather, it may remain in its manger blocking position but free to move back to its position aligned with the side of the stall.

This feature of the invention may be employed to detect the entry of a cow into the stall. Typically, a cow will attempt to achieve access to the manger 18 whether or not the forcer gate is blocking the same. When the forcer gate is not held in a blocking position by reason of the actuation of the cylinder 98, upon being nudged by a cow seeking access to the manger 18, the same will pivot back to its position aligned with the side of the stall and such movement can be employed to actuate a switch or the like to provide a manifestation of the entry of a cow into the stall. Of course, if this feature is not desired, then the length of the slot 102 may be decreased an appropriate amount so that as the front gate approaches its closed position, the end of the slot 102 will engage the pin 104 to positively move the forcer gate back to its position aligned with the side of the stall.

Figure 4:
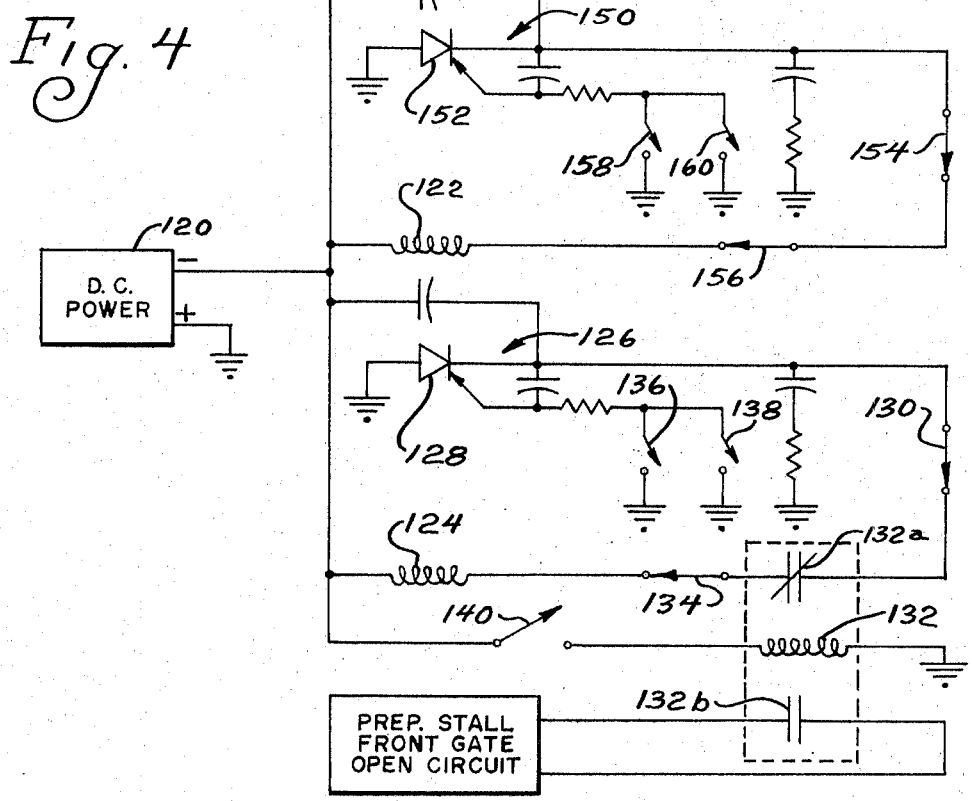
FIG. 4 shows one electrical control circuit which may be used in conjunction with the stall when the gates thereof are power operated.

FIG. 4 illustrates one form of a control circuit that may be used in the invention and which may be further employed to operate a prep stall when the stall of the invention is used as a milking stall. In particular, there is provided a DC power source 120 which will normally have low voltage direct current output and may include a step-down transformer along with a full wave rectifier. The negative side of the source 120 is connected to the coil of each of a rear gate electrically operated valve 122 and a front gate electrically operated valve 124. The valve 122 is such that when its coil is energized, air will be supplied from any suitable source to the rear gate cylinder 88 so that its piston rod will extend to open the gate. Similarly, the front gate valve 124 is arranged so that when its coil is energized, the front gate cylinder 98 will open the front gate 42.

Additionally, the system is such that when either of the valves 122 and 124 have their coils non-energized, the piston rods of the associated cylinders 88 and 98 will be retracted. This may be accomplished either by providing a spring return for each or, in the alternative, employing double acting cylinders in connection with three-way valves in the pneumatic system.

The circuit including the front gate valve 124 further includes a silicon controlled rectifier circuit, generally designated 126, including a silicon controlled rectifier 128 having its anode connected to ground. The cathode of the same is connected through a first normally closed switch 130, normally closed contacts 132a of a conventional time delay relay 132 and an additional normally closed switch 134 to the opposite end of the coil of the valve 124. Thus, it will be appreciated that when the silicon controlled rectifier 128 is conducting, the valve 124 will have its coil energized, providing all switch contacts in the circuit are closed, to open the front gate.

The gate of the silicon controlled rectifier 128 in addition to the resistive and capacitive connections shown, is connected to a pair of swtiches 136 and 138, each of which are normally open and which may be closed to connect the gate to ground.

The front gate circuit further includes the serial combination of the coil of the relay 132 and a normally open switch 140 across the source of power 120. The switch 140 may be connected in any suitable fashion to the front gate 42 so as to be closed whenever the front gate is in an open position.

Turning now to the rear gate circuit 122, the same includes a silicon controlled rectifier circuit 150 including a silicon controlled rectifier 152 having its anode connected to ground and its cathode connected through a normally closed switch 154 and a normally closed switch 156 to the coil of the rear gate valve 122. As a result of the foregoing, it will be appreciated that whenever the silicon controlled rectifier 152 is conducting, the coil of the valve 122 will be energized and the rear gate will be maintained in an open position.

The gate of the silicon controlled rectifier 152 includes connections to ground through normally open switches 158 and 160, one of which is for manual use and the other of which is mechanically connected to the front gate so as to momentarily close each time the front gate returns to a closed position.

The operation of the system is as follows. When a cow in the stall has been milked or fully prepared, depending upon the use to which the stall is put, one of the switches 138 and 136 will be closed to trigger the silicon controlled rectifier 128 thereby energizing the coil of the valve 124. This will result in the opening of the front gate 42 along with movement of the forcer gate 32 to the manger blocking position. Upon the front gate 42 reaching a full open position, switch 140 will be closed thereby to energize the relay 132. The relay 132, being a conventional time delay relay, will after a predetermined time has elapsed following its energization, open the contacts 132a. This will break the primary path of conduction through the silicon controlled rectifier 128 resulting in de-energization of the coil of the valve 124 and the resultant closing of the front gate 42. Since the switch 136 or 138 that was tripped will only have been closed momentarily, conduction will not be re-established and the front gate will remain closed. The returning of the front gate 42 to a closed position will result in one of the switches 158 and 160 being tripped to trigger the silicon controlled rectifier 152 thereby energizing the rear gate valve 122 to cause the rear gate to open.

Thus, a cow in line may enter the stall with the front gate already closed precluding an inadvertent escape. Upon entering the stall, switch 154 will be opened by the cow. This can be accomplished either by employing a so-called wand switch in the stall which may be mounted on one of the pipe members 54 to be tripped when the cow enters the stall or, alternatively, by mechanical connection to the forcer gate 32 whereby the switch 154 will be momentarily opened when the cow nudges the forcer gate 32 to a position aligned with the side wall to achieve access to the manger 18. At that time, the primary path of conduction through the silicon controlled rectifier 152 will be broken to de-energize the coil of the valve 122 to ultimately result in the closing of the rear gate.

In general, a number of the switches mentioned will be inactive in the sequence, but may be employed for manual override purposes. For example, the rear gate 34, if opened, can be closed by manual actuation of switch 156. Similarly, it may be opened at any time by manual actuation of whichever one of the switches 158 and 160 is not operated by the front gate 42. The switch 138 and the switches 130 and 134 may be similarly employed to open or close, respectively, the front gate out of sequence.

The invention also lends itself to use in connection with other equipment. For example, when the stall is used as a milking stall, it may be advantageously employed with a preparation stall of the type described in the aforementioned Needham et al application. Specifically, by provision of an additional, normally open set of contacts 132b on the time delay relay 132, which may be connected to the triggering circuit for the front gate in the Needham et al stall, the front gate of such a preparation stall may be automatically caused to open at the same time the front gate of the milking stall is caused to close and the rear gate thereof to open. Thus, once a cow has been released from the stall following milking, and the front gate thereof closed and the rear gate opened, at which time the stall is in readiness for receipt of a cow prepared for milking, the preparation stall will automatically release a prepared cow who may then progress into the stall for milking whereupon the rear gate will close automatically as described aforesaid.

The aforementioned contacts 132b can similarly be employed with advantage if the stall of this invention is employed as a preparation stall. In such a case, they could be employed to activate, through a time delay relay, a gate from a corral which would only be opened sufficiently long to permit one cow to exit the corral and then move into the preparation stall. We claim:

1. In a stall for confining a cow during milking or preparation prior to milking including opposed sides, a front and a rear, a feed manger adjacent the front, a front gate openable to permit a cow to leave the stall and a rear gate openable to permit a cow to enter a stall, the improvement comprising: a forcer gate pivotally mounted on said stall and adapted to swing across the feed manger to force the head of a cow within the stall out of and away from the feed manger, and means responsive to at least the partial opening of said front gate for thereafter swinging said forcer gate across the feed manger whereby when the front gate is opened to permit a cow to leave the stall, the forcer gate is operative to move a hesitant cow's head away from the feed manger and toward the open front gate.

2. A stall according to claim 1 further including a power operator for opening said front gate, and wherein said forcer gate swinging means includes a link connected to said front gate and having a lost motion connection therein to said forcer gate so that said front gate will at least partially open before said forcer gate is swung across said feed manger.

3. A stall according to claim 2 wherein said lost motion connection is constructed and arranged such that said front gate may be closed after said forcer gate has been swung across the feed manger to a manger blocking position without moving said forcer gate from said manger blocking position but without restricting movement of said forcer gate from said manger blocking position.

4. A stall for confining cows comprising:
an elongated side wall having a front end and a rear end; a feed manger adjacent said front end and defining the front of the stall; a generally U-shaped gate having a base and a leg; means pivotally mounting the leg of said L-shaped gate for movement about a generally vertical axis between a position wherein the base is remote from said rear end to allow a cow to enter the stall and a position whereat said base is adjacent said rear end to preclude a cow from leaving the stall; a front gate; means pivotally mounting said front gate for movement about a substantially vertical axis between a first position whereat an end thereof is adjacent said manger to close said stall and a second position whereat said front gate end is remote from said feed manger to allow a cow to leave the stall; a forcer gate; means pivotally mounting one end of said forcer gate on said stall side with the opposite end thereof adjacent said feed manger, said forcer gate being movable between a first position substantially aligned with said stall side and a second position whereat said opposite end is swung across and in front of said feed manger; means responsive to the moving of said front gate to said remote position for moving said forcer gate to the second position thereof whereby when it is desired to release a cow from the stall, a balky cow will have its head forced out of and away from the feed manger toward the opening left by the movement of said front gate to said remote position thereof, said moving means further including means for allowing said front gate to be returned to said first position thereof without moving said forcer gate from said second position thereof.

5. The stall of claim 4 further including an elevated rail generally aligned with said side, at least three uprights, one for each of said gates, each being secured to a respective gate remote from the pivot axis thereof; a first fluid operated cylinder secured to said rail and to the upright associated with said L-shaped gate and operable to open and close said L-shaped gate; a second fluid operated cylinder connected to said rail and to the upright associated with said front gate and operable to open and close said front gate; and wherein the means responsive to movement of the front gate includes a link secured to the upright on said front gate and to the upright for said forcer gate; and means for selectively energizing said fluid operated cylinders.

6. A stall according to claim 4 further including first power operated means for opening and closing said front gate; second power operated means for opening and closing said L-shaped gate; and control means for said first and second power operated means including manually operable means for causing said first power operated means to open said front gate, means responsive to the opening of said front gate for, after a predetermined time delay, closing said front gate and for opening said L-shaped gate; and means responsive to the movement of a cow into said stall through said L-shaped gate when in an open position for closing said L-shaped gate.

7. A stall according to claim 6 further including manually operable means for closing said front gate; manually operable means for opening said rear gate; and manually operable means for closing said rear gate.

8. A milking stall for a cow comprising the stall of claim 6 and further including means adapted to be associated with the control circuit of a preparation stall and responsive to the closing of said front gate for opening the front gate of a preparation stall to which it may be connected.

9. A stall for confining cows comprising: an elongated side wall having a front end and defining the front of the stall; a generally L-shaped gate having a base and a leg; means pivotally mounting the leg of said L-shaped gate for movement about a generally vertical axis between a position wherein the base is remote from said rear end to allow a cow to enter the stall and a position whereat said base is adjacent said rear end to preclude a cow from leaving the stall; a front gate; means pivotally mounting said front gate for movement about a substantially vertical axis between a first position whereat an end thereof is adjacent said manger to close said stall and a second position whereat said front gate end is remote from said feed manger to allow a cow to leave the stall; a forcer gate, means pivotally mounting one end of said forcer gate on said stall side with the opposite end thereof adjacent said feed manger, said forcer gate means movable between a first position substantially aligned with said stall side and a second position whereat said opposite end is swung across and in front of said feed manger; means responsive to the moving of said front gate to said remote position for moving said forcer gate to the second position thereof whereby when it is desired to release a cow from the stall, a balky cow will have its head forced out of and away from the feed manger toward the opening left by the movement of said front gate to said remote position thereof, an elevated rail generally aligned with said side, at least three uprights, one for each of said gates, each being secured to a respective gate remote from the pivot axis thereof; a first fluid operated cylinder secured to said rail and to the upright associated with said L-shaped gate and operable to open and close said L-shaped gate; a second fluid operated cylinder connected to said rail and to the upright associated with said front gate and operable to open and close said front gate; and wherein the means responsive to movement of the front gate includes a link secured to the upright on said front gate and to the upright for said forcer gate; means for selectively energizing said fluid operated cylinders; said link being connected to the upright for one of said forcer gate and said front gate by a lost motion connection means for allowing said front gate to be moved toward said remote position a substantial distance before said forcer gate is swung to its position blocking said feed manger.

* * * * *

UNITED STATES PATENT OFFICE
CERTIFICATE OF CORRECTION

Patent No. 3,805,742     Dated April 23, 1974

Inventor(s) Robert J. Shulick, Lyle L. Needham, Harold V. Swanson

It is certified that error appears in the above-identified patent and that said Letters Patent are hereby corrected as shown below:

Column 8, line 45, that is, claim 4, line 4,

"U" should read "L".

Signed and sealed this 29th day of April 1975.

(SEAL)
Attest:

RUTH C. MASON
Attesting Officer

C. MARSHALL DANN
Commissioner of Patents
and Trademarks